United States Patent [19]
Richardson et al.

[11] 3,843,616
[45] Oct. 22, 1974

[54] VINYL CHLORIDE-ETHYLENE COPOLYMERS AND THE PREPARATION THEREOF

[75] Inventors: Dean E. Richardson, La Marque, Tex.; Gordon G. Harkreader, South Charleston, W. Va.

[73] Assignee: Union Carbide Corporation, New York, N.Y.

[22] Filed: Feb. 25, 1970

[21] Appl. No.: 13,957

Related U.S. Application Data

[63] Continuation-in-part of Ser. No. 546,405, April 29, 1966, abandoned.

[52] U.S. Cl... 260/87.5 C, 260/28.5 A, 260/31.8 R, 260/32.8 R, 260/92.8 W
[51] Int. Cl.......................... C08f 1/11, C08f 15/02
[58] Field of Search............................... 260/87.5 C

[56] References Cited
OTHER PUBLICATIONS

Schildknecht, C. E., Polymer Processes, Interscience Publishers Inc., N.Y., 1956, p. 69 & 71 relied on.

*Primary Examiner*—Stanford M. Levin
*Attorney, Agent, or Firm*—Reynold J. Finnegan

[57] ABSTRACT

A method for producing porous vinyl chloride-ethylene copolymers containing at least 98.1 per cent by weight of vinyl chloride and 0.3 to 1.9 per cent by weight of ethylene which comprises continuous one-stage suspension polymerization of vinyl chloride and ethylene; and the vinyl chloride-ethylene copolymers produced thereby.

3 Claims, 1 Drawing Figure

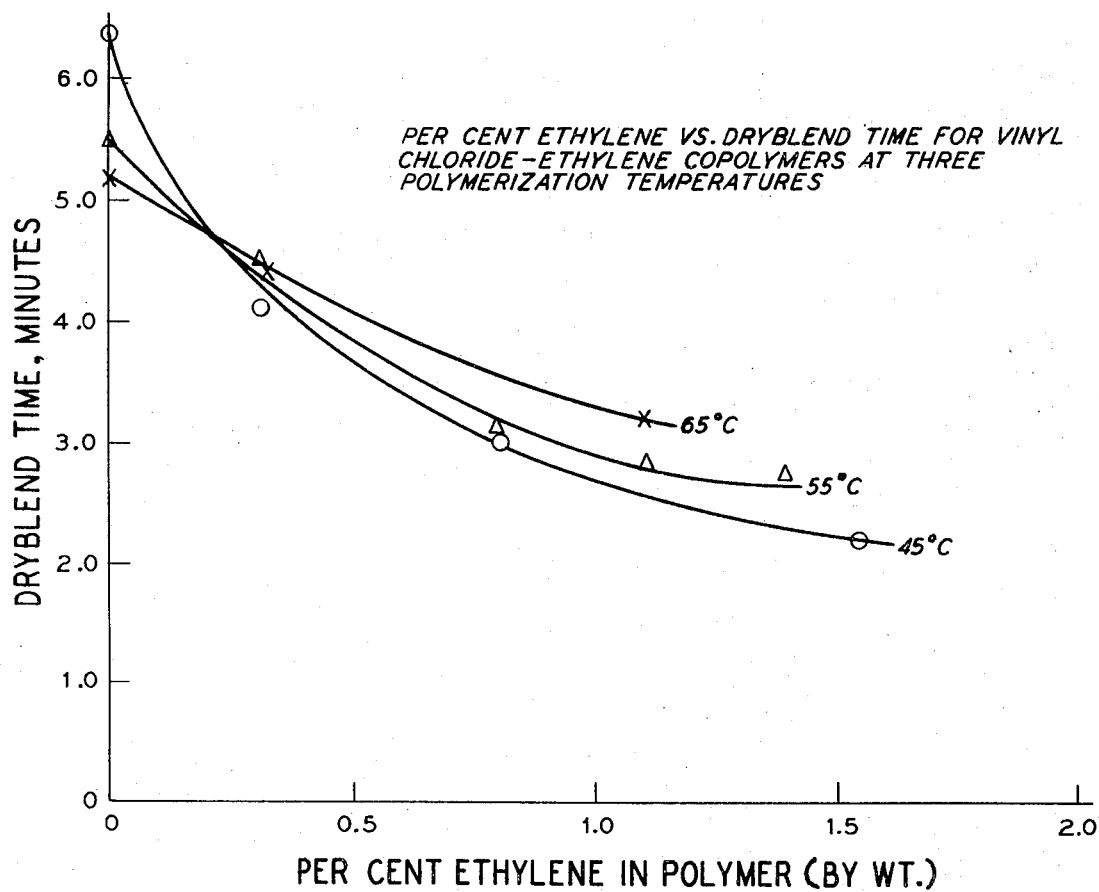

VINYL CHLORIDE-ETHYLENE COPOLYMERS AND THE PREPARATION THEREOF

This application is a continuation-in-part of application Ser. No. 546,405, filed Apr. 29, 1966 and now abandoned.

BACKGROUND OF THE INVENTION

This invention is directed to vinyl chloride polymers and their preparation. More particularly, this invention relates to vinyl chloride-ethylene copolymers having enhanced porosity prepared by suspension polymerization.

Porous vinyl chloride polymers, often referred to as vinyl resins, are thermoplastic in nature and have found wide acceptance in the polymer field. Great quantities of vinyl resins are being consumed today for the fabrication of flexible polymers, sheetings, fabric coatings and wire insulation. In order to be useful, however, they must be plasticized with plasticizers such ad dioctyl phthalate, diisodecyl phthalate, dioctyl sebacate, trioctyl phosphate, and the like. Accordingly, particle porosity is an important property of these resins since it determines the ability of the resin to absorb these liquid plasticizers in fabrication operations such as calendering, molding and extrusion. In view of the fact that desired resin-plasticizer ratios can vary widely depending on the fabrication process and end use of the fabricated articles, control of particle porosity in vinyl chloride resins is extremely important in their manufacture from the monomer by polymerization. Resins which absorb plasticizer readily and yield a sandy, free-flowing preblend are known as dryblend resins. Dryblendability of the vinyl chloride resin is still another particularly important attribute inasmuch as it permits rapid blending of resin, plasticizer, stabilizer, filler and the like in equipment such as ribbon blenders, sigma mixers, and the like, affording a free-flowing preblend which can readily be fed to calenders, extruders or other fabrication machinery.

Even in the case of resins which because of small, irregular particle geometry are not dryblendable, that is do not yield a dry, sandy, free-flowing preblend, high porosity is still very important because it makes possible a more homogeneous pre-blend than could otherwise be obtained. The more homogeneous preblend permits reduced mixing time and faster fluxing cycles in hot-processing equipment such as Banbury mixers, and the like.

Polyvinyl chloride homopolymer resins, prepared by suspension polymerization are well known in the art as witnessed by U.S. Pat. Nos. 3,161,623; 3,205,204 and 3,375,238. There has been a continuing search in this field to improve the porosity and dryblend properties of vinyl chloride homopolymers. Heretofore, attempts to provide such an improved polyvinyl chloride homopolymer have centered on various suspension polymerization techniques which depend for the most part on the particular protective colloid, i.e., suspension agent, employed by the suspension process. However, while such techniques were a substantial improvement in the art, one of the major drawbacks of such prior art processes was their great dependency upon the particular protective colloid employed, which tends to limit any control of the porosity of the vinyl chloride homopolymer.

SUMMARY OF THE INVENTION

It has now been discovered that vinyl chloride polymer particles containing at least about 98.1 percent by weight of vinyl chloride and 0.3 to 1.9 percent by weight of ethylene polymerized therein are characterized by having an enhanced porosity and dryblendability above that of its corresponding polyvinyl chloride homopolymer.

Yet, although the vinyl chloride polymers of this invention have small amounts of ethylene copolymerized therein, that is, up to 1.9 percent by weight, they are predominantly vinyl chloride resins exhibiting other physical and chemical properties very similar to, if not the same as, polyvinyl chloride homopolymers. The inclusion of ethylene in the vinyl chloride polymer changes the physical structure of the polymer particles so that an increase in porosity and dryblendability results over that heretofore obtainable in the corresponding polyvinyl chloride homopolymer, and at the same time allows one to employ the copolymers of this invention for the same purposes as one would employ the polyvinyl chloride homopolymer in many instances just as if an improved homopolymer were actually made.

Therefore, it is an object of this invention to provide porous polyvinyl chloride-ethylene copolymers containing at least 98.1 percent by weight of vinyl chloride and having from 0.3 to 1.9 percent by weight of ethylene polymerized therein. It is another object of this invention to provide a suspension polymerization process for preparing said polyvinyl chloride-ethylene copolymers. Other objects and advantages of this invention will become readily apparent from the following description and appended claims.

More specifically the polymers of this invention can be described as porous vinyl chloride polymer resins containing at least 98.1 percent by weight of vinyl chloride and 0.3 to 1.9 percent by weight of ethylene polymerized therein, characterized by having a sorption value greater than about 50 parts of dioctyl phthalate plasticizer per hundred parts of resin when measured in accordance with ASTM D-1755-60T. The preferred polymers being those containing at least 98.3 percent by weight of vinyl chloride and from 0.3 to 1.7 percent by weight of ethylene, and most especially those containing at least about 98.5 percent by weight of vinyl chloride and from about 0.3 to about 1.5 percent by weight of ethylene.

In addition the suspension polymerization process of this invention can be described more specifically as a method for producing an enhanced porous vinyl chloride-ethylene copolymer containing at least 98.1 percent by weight of vinyl chloride and 0.3 to 1.9 percent by weight of ethylene polymerized therein, which comprises a. a continuous, one-stage polymerization of liquid vinyl chloride and gaseous ethylene monomers in an aqueous suspension containing per 100 parts by weight of vinyl chloride:
  1. from about 0.05 to 1.0 parts of a protective colloid,
  2. from about 0.02 to 1.0 parts of a free radical vinyl polymerization initiator,
  3. from about 150 to 400 parts of water, and
  4. sufficient ethylene to afford an autogenous pressure of about 60 to 400 psig. at a temperature of about 35° to 80°C. for at least 4 hours, and, b. recovering the vinyl chloride-ethylene copolymer from the suspension system.

DESCRIPTION OF THE PREFERRED EMBODIMENTS

While discontinuous suspension polymerization of the monomers of vinyl chloride and ethylene by the delayed feed of either or both of the monomers to be polymerized is possible, such is not considered desirable in view of the interaction of the monomers. For instance, discontinuous addition of the vinyl chloride monomer after particle formation has begun can result in the vinyl chloride penetrating the pores of the particle and polymerizing there, reducing the porosity by effectively plugging the pores. Moreover, it has been found that the desired optimum results with regard to the instant vinyl chloride-ethylene copolymer's porosity and dryblendability are easily obtained and controlled by continuous polymerization without resorting to such complex interrupted polymerization techniques. Accordingly, the term "continuous" used to characterize the instant suspension process invention is intended to mean a process which excludes the addition of vinyl chloride and/or ethylene in a series of incremental amounts during the polymerization. Moreover, the expression "one stage" used to characterize the instant suspension process invention is intended to mean a process which excludes multiple stage temperature controlled polymerization steps, that is to say, deliberately carrying out part of the polymerization process at a specified temperature for a definite period of time and then controlling the reaction by further polymerizing at a different lower or higher temperature for another definite period of time and so forth until the completion of the reaction process. Such is not considered desirable since the molecular weight of the copolymer product is controlled to a substantial degree by the polymerization temperature and to vary said temperature so drastically as to effectually make a two-stage process of the operation would serve only to defeat the unique controlability one can maintain in predetermining the physical properties of the vinyl chloride-ethylene copolymers of this invention as produced by the continuous, one-stage method. The instant continuous one-stage suspension polymerization process can easily be carried out by merely adding the entire amount of ethylene monomer to the entire amount of vinyl chloride at the desired polymerization temperature and maintaining the reaction at said temperature for that period of time necessary to produce the desired copolymer product or alternatively adding the entire amount of ethylene monomer to the entire amount of vinyl chloride at a lower temperature while raising the temperature to the desired polymerization temperature, or bringing the temperature to said polymerization temperature immediately after all the ethylene has been added, and maintaining the reaction at said polymerization temperature for that period of time necessary to produce the desired copolymer product.

The term "enhanced porosity" used to characterize the vinyl chloride polymer particles of the present invention is intended to include both dryblend type resins and blotter-type resins. The former take up plasticizers mainly by absorption since their particles are regular in shape and large in size, viz; in the range of about 150 to 250 microns. The latter on the other hand take up a high proportion of plasticizers by both absorption and adsorption since their particles are irregular in shape and small in size, viz.; about 110 microns or less.

The vinyl chloride polymer resin particles produced in this invention, including both the dryblend and blotter-type resins, have a sorption value greater than about 50 parts of plasticizer (dioctyl phthalate) per 100 parts of resin when measured in accordance with ASTM D-1755-60T. The dryblend type are further defined as having dryblend times of less than about 15 minutes when measured with a Brabender Plasticorder. Dryblend time has been found to decrease sharply with increasing concentration of ethylene up to a point where the resultant vinyl chloride polymer contains about 1.5 percent by weight of ethylene. This effect is delineated in the accompanying drawing which is a plot of dryblend time as the ordinate against percent ethylene in the polymer as the abscissa at polymerization temperatures of 45°C., 55°C. and 65°C., respectively. It is thus clear from the graph that the dryblend time will level off with increasing concentration amounts of ethylene polymerized in the instant vinyl chloride polymer and that any improvement that might possibly be gained by adding more than 1.9 percent by weight of ethylene to the instant vinyl chloride polymer will be so slight as to be practically insignificant and therefore actually detrimental in that it will be off-set by the fact that as the amount of ethylene is increased the vinyl chloride-ethylene copolymer may begin to lose its valuable and desired vinyl chloride homopolymer aspects due to the decreasing amount of vinyl chloride in the resin.

As mentioned one of the advantages of the suspension process of this invention resides in the control of the porosity of the vinyl chloride-ethylene product over a wide range of molecular weights normally found in polyvinyl chloride resins. The instant process renders it possible to obtain varying degrees of porosity for a vinyl chloride-ethylene copolymer having essentially the same molecular weight. Since molecular weight is generally controlled by polymerization temperature, it is particularly useful that this invention may be practiced at polymerization temperatures as low as about 35°C. and as high as about 80°C. or higher if desired. Thus for any given polymerization temperature which controls the molecular weight (normally defined in terms of inherent viscosity) of the vinyl chloride-ethylene copolymer produced, the porosity and dryblendability of said copolymer can be controlled by the selection of the particular colloid and/or amount of ethylene employed in the instant polymerization method. Previous to this surprising discovery, for any given polymerization temperature, the porosity of the vinyl chloride homopolymer could only be controlled by one variable which was the selection of the protective colloid employed.

Although not required, chain transfer agents may also be used to control vinyl chloride polymer molecular weight if desired. Some of the chain transfer agents which can be used include trichloroethylene, tetrachloroethylene, trichloroethane, carbon tetrachloride, and the like.

Free-radical vinyl polymerization initiators which can be used in the present process invention include diacyl peroxides, alkyl peroxydicarbonates, azo initiators, and the like. It is preferred to employ as the diacyl peroxides such compounds as dilauroyl peroxide, dicapryloyl peroxide, benzoyl peroxide and the like.

The preferred azo initiators include azobisisobutylronitrile, α, α'-azodicyclohexanecarbonitrile, azobis α, α'-dimethylvaleronitrile, dimethyl-α, α'-azodiisobutyrate, and the like. Preferred alkyl peroxy dicarbonates include isopropylperoxy dicarbonate, butyl peroxy dicarbonate, isobutyl peroxy dicarbonate, and the like. The choice of polymerization temperature will determine the actual initiator employed. Thus, for example, where temperatures of 35°-55°C. are used, alkyl peroxy dicarbonates are preferred. Where temperatures in the 55°-70°C. range are used, diacyl peroxides are preferred. Where temperatures in the 65°-80°C. range are used, azo initiators are preferred. The preparation of the vinyl chloride polymers of this invention is conveniently carried out in jacketed, agitated autoclaves capable of withstanding pressures up to about 500 psig. The exact design and shape are not critical. The operating pressures employed in this invention are determined by the combined autogeneous pressure generated by the vinyl chloride and ethylene monomeric reactants. The preferred operating pressures are about 100 to 400 psig. In this pressure range up to about 25 percent at most of the ethylene monomer charged polymerizes with vinyl chloride. The remainder can be recovered as ethylene monomer.

The type of agitation is not normally critical and is that commonly used in the industry for the polymerization of vinyl chloride. The preferred protective colloid employed in this invention is a combination of methyl cellulose and hydroxyethyl cellulose. It has been found convenient to charge the methyl cellulose to the autoclave as a 3 percent aqueous solution (the methyl cellulose having a viscosity of 15 centipoises as a 2 percent solution in water at 20°C.) It is convenient to charge the hydroxyethyl cellulose to the autoclave as the 2 percent aqueous solution (the hydroxy ethyl cellulose having a viscosity of 300 centipoises as a 2 percent solution in water at 20°C.). However, this invention is not limited to the use of mixtures of methyl cellulose and hydroxyethyl cellulose as protective colloids. Any protective colloid suspending agent suitable for suspension polymerization of vinyl chloride homopolymer can be employed, if desired. Examples of such protective colloids which can be used include polyvinyl alcohols; polyethylene oxide; poly(ethylene glycol) coupled with the diglycidyl ether of 2,2-bis(4-hydroxyphenyl)propane; a combination of methyl cellulose, a sodium alkyl sulfonate and calcium chloride; polyvinyl pyrrolidone with various secondary suspending agents or surfactants such as those disclosed in U.S. Pat. Nos. 2,890,199 and 2,857,367; methyl cellulose, gelatin and the like.

The amount of protective colloid used in this invention can vary between about 0.05 and 1.0 parts by weight, or higher if desired, per hundred parts by weight of vinyl chloride although it is preferred to use between about 0.06 and 0.6 parts by weight.

The concentration of free-radical initiator is preferably in the range of about 0.04 to 0.4 parts by weight per hundred parts by weight of vinyl chloride but as little as 0.02 parts or as much as 1.0 parts by weight or higher can be used if desired.

The amount of water used in this process can vary between about 150 and 400 parts by weight or higher if desired per hundred parts by weight of vinyl chloride with 180 to 250 parts by weight being a preferred range.

A distinguishing feature of the instant suspension process invention and that of the prior art cited above is the fact that the instant invention involves the polymerization of a liquid vinyl chloride monomer and a monofunctional gaseous ethylene monomer, while the prior art teaches the homopolymerization of liquid vinyl chloride and the copolymerization of liquid vinyl chloride and difunctional liquid copolymerizable monomers, such as vinyl esters of alkanoic acids, e.g., vinyl acetate, vinylidene chloride, esters of acrylic acid, etc. Moreover, the effect of producing the instant vinyl chloride-ethylene copolymers by the suspension process of the instant invention having extremely better dryblendability and porosity then a vinyl chloride homopolymer produced by the same process is indeed surprising in view of the fact that no such substantial improvement was found when a similar vinyl chloride-acetate copolymer was also prepared by the same method.

With regard to the vinyl chloride-ethylene polymers of the instant invention dryblendability can be easily and accurately determined using a Brabender Plasticorder. This instrument is widely used for a variety of tests by polymer producers and users, and consists of a jacketed mixing chamber in which two horizontal mixing blades rotate. The mixing blades are driven by a constant speed electric motor which is connected so that the torque required to turn the blades in accurately measured and continuously recorded on a strip chart. To measure dryblend time with a Brabender Plasticorder, the vinyl chloride polymer resin (200 gm.) and calcium carbonate filler (84 gm.) are added to the mixing chamber and thoroughly blended. Then a liquid diisodecyl phthalate plasticizer (103 gm.) is added, noting the time. Torque immediately increases because of the initially pasty character of the mixture. After several minutes, the resin sorbs all of the plasticizer and the mix suddenly becomes dry, sandy and free-flowing. At this point, of course, the torque decreases drastically to an equilibrium point. The elapsed time between the adding of the liquid mix and the point of equilibrium dryblend torque is recorded as the dryblend time. Short dryblend times are obviously desirable. The test can be varied by changing the plasticizer or the ratio of resin to plasticizer, but the relative results will be the same.

All porous resins of the instant invention as pointed out supra will not dryblend because of irregular particle geometry or variations in the ratio of surface area (particle size) to pore volume. Resins with high surface area (small particles) but relatively low pore volume will adsorb plasticizer on the particle surface but will not absorb much plasticizer into the pores, thus they remain wet and pasty. Porous resins with irregular particle shapes will sorb plasticizer, but because of their geometry will not become completely free flowing. Instead, the preblend reaches a fluffy, semi-freeflowing consistency.

Sorption values of the vinyl chloride polymer products of this inention were also determined (ASTM D-1755-60T) expressed as parts of dioctyl phthalate plasticizer absorbed per hundred parts of resin. Greater plasticizer sorption indicates a more porous resin. This value is a satisfactory measure of particle porosity for non-dryblendable resins, but for dryblend resins it is less meaningful than the Brabender Plasticorder values in that:

1. No indication of the time required to sorb a given amount of plasticizer is given, and
2. No allowance is made for particle size differences, and plasticizer absorbed on the resin surfaces is thus ignored.

The instant vinyl chloride-ethylene copolymers of this invention exhibit excellent processability at commercial available stock temperatures and are particularly useful in preparing thermoplastic materials in the form of films, sheets, bottles, and the like. Such thermoplastic materials possess excellent impact strength and rigidity as well as good chemical resistance and low permeability to water, oxygen flavor and odor essences.

Of particular interest are the preferred vinyl chloride-ethylene copolymers of this invention containing up to 1.7 percent of ethylene polymerized therein which were found to produce blow molded thermoplastic products, e.g., bottles, having high clarity even when formulated with conventional additives such as stabilizers, lubricants, processing aids and impact modifiers. Those copolymers containing from 0.3 to about 1.5 percent of ethylene are especially desired due to their very low ethylene content.

The following examples are illustrative of the present invention and are not to be regarded as limitative. It is to be understood that all of the parts, percentages and proportions referred to herein and in the appended claims are by weight unless otherwise indicated.

EXAMPLE 1

Using a jacketed, stainless steel autoclave having a capacity of 600 gallons and equipped with a retreat-curve agitator, 2,830 parts of deionized water, 20.2 parts of a 3 percent methyl cellulose solution (the methyl cellulose having a viscosity of 15 cp as a 2 percent solution in water at 20°C.), 91.4 parts of a 2 percent hydroxyethyl cellulose solution (the hydroxyethyl cellulose having a viscosity of 300 cp as a 2 percent solution in water at 20°C.), and 1.58 parts of sodium bicarbonate were charged and agitated until thoroughly mixed. Then 1,260 parts of vinyl chloride were added, along with 4.16 parts of dilauroyl peroxide. The charge was agitated continuously at 215 rpm while sufficient ethylene was added to bring the autoclave pressure to 100 psig at 40°C., after which the agitation was continued at 215 rpm while the charge was immediately heated to and maintained at 55°C. After 7¾ hours, the reaction was essentially complete, as evidenced by a 10 psig pressure drop, and the polymerization was terminated by cooling and venting. The vinyl chloride polymer in the form of resin particles was recovered by washing, centrifuging and drying, being in the form of white, regular, roughly spherical particles having an inherent viscosity of 0.98 (ASTM 1243, Method A), an ethylene content of 0.3 percent by weight, and a dry-blend time of 4.5 minutes as measured with a Brabender Plasticorder described above. Other physical data are presented in Table I. Screen analysis and medium particle size determinations are presented in Table II.

EXAMPLES 2, 3 AND 4

The process of Example 1 was repeated except that the initial ethylene charge was increased to 140 psig, 160 psig and 180 psig at 40°C., respectively. Reaction times, inherent viscosities, ethylene contents and dry-blend times are shown in Table I. Screen analysis and median particle size determinations are presented in Table II.

CONTROL A

The process of Example 1 was repeated except that no ethylene was used, in order to obtain a vinyl chloride homopolymer resin for comparison. Properties are shown in Table I and Table II.

EXAMPLES 5 AND 6

The process of Example 1 was repeated except that the dilauroyl peroxide was decreased to 126 parts, the ethylene was added to obtain a pressure of 100 psig and 140 psig at 40°C., respectively, and the polymerization temperature was immediately raised to 65°C. Resin data are shown in Table I and Table II.

CONTROL B

The process of Examples 5 and 6 was repeated, except that no ethylene was used, in order to provide a vinyl chloride homopolymer resin for comparison. Resin properties are shown in Table I and Table II.

EXAMPLES 7, 8 AND 9

The process of Example 1 was repeated except that 1.27 parts of isopropyl peroxy dicarbonate were substituted for the dilauroyl peroxide, the polymerization temperature was decreased to 45°C., and ethylene added to obtain pressure of 100 psig, 140 psig and 180 psig at 40°C. Resin properties are shown in Table I and Table II.

CONTROL C

The process of Examples 7, 8 and 9 was repeated except that no ethylene was used, in order to provide a vinyl chloride homopolymer for comparison. Properties are shown in Table I and Table II.

EXAMPLE 10

The process of Example 1 was repeated, except that the suspending agent used was 67.5 parts of a 2 percent solution of methyl cellulose (the methyl cellulose having a viscosity of 15 cp. as a 2 percent solution in water at 20°C.). The charge was agitated at 130 rpm while sufficient ethylene was added to bring the autoclave pressure of 200 psig at 40°C., after which the agitation was continued at 130 rpm while the charge was immediately heated to and maintained at 56°C. After 8.2 hours., the reaction was essentially complete, as evidenced by a 10 psig pressure drop, and the polymerization was terminated by cooling and venting. The vinyl chloride polymer was recovered by washing, centrifuging and drying, being in the form of white, irregular particles. Resin data are shown in Table I and Table II.

CONTROL D

The process of Example 10 was repeated, except that no ethylene was used, in order to obtain a vinyl chloride homopolymer resin for comparison. Properties are shown in Table I and Table II.

EXAMPLE 11

Using a jacketed, glass-lined autoclave having a capacity of 5,700 gallons and equipped with a retreat-curve agitator, 23,300 parts of deionized water, 200 parts of a 3 percent methyl cellulose solution (the methyl cellulose having a viscosity of 15 cp. as a 2 percent solution in water at 20°C.), 900 parts of a 2 percent hydroxyethyl cellulose solution (the hydroxyethyl cellulose having a viscosity of 300 cp. as a 2 percent solution in water at 20°C.), and 13 parts of sodium bicarbonate were charged and agitated until thoroughly mixed. Then 10,850 parts of vinyl chloride were added, along with 15 parts of isopropyl peroxydicarbonate catalyst. The charge was agitated continuously at 120 rpm while 600 parts of ethylene were added, after which the agitation was continued at 120 rpm while the charge was immediately heated to and maintained at 41°C. After 12 hours, the reaction was essentially complete, as evidenced by a 25 psig pressure drop, and the polymerization was terminated by cooling and venting. The vinyl chloride polymer was recovered by washing, centrifuging and drying, being in the form of white, regular, roughly spherical particles. Resin properties are shown in Tables I and II.

CONTROL E

In order to provide a PVC homopolymer of similar particle size and inherent viscosity for comparison, the process of Example 11 was repeated except that no ethylene was used and the isopropyl peroxydicarbonate catalyst charge was reduced to 10 parts. Resin properties are shown in Tables I and II.

EXAMPLE 12

A 600-gal. autoclave equipped with a Pfaudler retreatcurve agitator was purged to remove oxygen, then charged with 55 grams of sodium bicarbonate buffer and 2,472 lb. of deionized water. 21.7 lb. of a 3.22 percent aqueous solution of methyl cellulose (Methocel MC-15) and 91.9 lb. of a 2.96 percent aqueous solution of hydroxyethyl cellulose (Cellosize WP-300) were then added to the autoclave, after which the autoclave was agitated at 180 rpm for 10 minutes. 1,400 lb. of vinyl chloride and 0.322 lb. of isopropyl peroxydicarbonate were charged to the autoclave, after which the polymerization vessel was heated to 54°C. and maintained there with agitation about 4 hours and 20 minutes, or until the pressure drop reached 10 psi. The resulting vinyl chloride homopolymer was blown down, dewatered and dried. Analysis is shown in Table III below.

TABLE III

| | EXAMPLES | | |
|---|---|---|---|
| | 12 | 13 | 14 |
| % Vinyl Chloride | 100 | 98.7 | 99 |
| % Vinyl Acetate | — | 1.3 | — |
| % Ethylene | — | — | 1.0 |
| Dryblend time minutes | 5.0 | 5.2 | 4.0 |
| ASTM Sorption, pphr | 95 | 95.2 | 103 |

TABLE I

| Example | Reaction Time hrs. | Ethylene % by wt. | Inherent Viscosity | Dryblend Time min. | Bulk density, lb. per cu. ft. | Plasticizer sorption, phr[1] |
|---|---|---|---|---|---|---|
| 1 | 7:45 | 0.3 | 0.98 | 4.5 | 31.3 | 90 |
| 2 | 7:45 | 0.8 | 0.98 | 3.1 | 31.0 | 94 |
| 3 | 8:45 | 1.1 | 0.96 | 2.8 | 30.2 | 95 |
| 4 | 9:15 | 1.4 | 0.97 | 2.7 | 29.0 | 104 |
| Control A | 7:30 | 0 | 0.98 | 5.5 | 34.0 | 87 |
| 5 | 6:30 | 0.3 | 0.78 | 4.5 | 34.8 | 84 |
| 6 | 7:45 | 1.1 | 9.76 | 3.2 | 34.2 | 86 |
| Control B | 7:30 | 0 | 0.76 | 5.2 | 35.0 | 71 |
| 7 | 6:15 | 0.3 | 1.21 | 4.1 | 27.8 | 101 |
| 8 | 4:15 | 0.8 | 1.18 | 3.0 | 28.5 | 110 |
| 9 | 5:15 | 1.55 | 1.13 | 2.2 | 27.1 | 119 |
| Control C | 4:15 | 0 | 1.12 | 6.4 | 31.0 | 95 |
| 10 | 8:10 | 1.7 | 0.90 | — | 24.2 | 120 |
| Control D | 6:20 | 0 | 0.94 | — | 32.0 | 93 |
| 11 | 12:00 | 1.9 | 1.33 | 2.7 | 26.2 | 119 |
| Control E | 11:00 | 0 | 1.35 | 4.0 | 29.0 | 100 |

[1] Parts plasticizer sorbed per hundred parts resin.

TABLE II

| Example number | 1 | 2 | 3 | 4 | Comp. A | 5 | 6 | Comp. B | 7 | 8 | 9 | Comp. C | 10 | Comp. D | 11 | Comp. E |
|---|---|---|---|---|---|---|---|---|---|---|---|---|---|---|---|---|
| Screen analysis, percent through— | | | | | | | | | | | | | | | | |
| 40 mesh | | | | | | | | | 100 | 100 | 100 | 100 | | | 100 | 100 |
| 60 mesh | 100 | 100 | 99 | 100 | 99 | 100 | 92 | 100 | 98 | 94 | 99 | 92 | 100 | 100 | 98 | 96 |
| 80 mesh | 100 | 83 | 69 | 78 | 65 | 97 | 44 | 43 | 42 | 27 | 39 | 47 | 99 | 100 | 27 | 38 |
| 100 mesh | 82 | 33 | 34 | 33 | 26 | 53 | 29 | 16 | 25 | 9 | 13 | 15 | 89 | 99 | 8 | 13 |
| 140 mesh | 22 | 11 | 10 | 10 | 5 | 14 | 18 | 4 | 13 | 3 | 4 | 8 | 45 | 91 | 2 | 10 |
| 200 mesh | 9 | 5 | 3 | 3 | 3 | 3 | 7 | 2 | 10 | 2 | 3 | 3 | 18 | 33 | 0 | 3 |
| 270 mesh | 7 | 4 | 0 | 0 | 1 | 1 | 3 | 0 | | | | | 6 | 13 | | |
| Median particle size, in microns | 142 | 168 | 160 | 160 | 168 | 178 | 186 | 184 | 182 | 177 | 186 | 150 | 110 | 83 | 195 | 196 |

The following Examples 12, 13 and 14 demonstrates that the vinyl chloride-ethylene copolymers of this invention produced by the instant suspension process have extremely better dryblendability and sorption properties then either a vinyl chloride homopolymer or a vinyl chloride-acetate copolymer prepared by the same method.

EXAMPLE 13

The polymerization of Example 12 was repeated except that the monomer charge consisted of 1,379 lb. of vinyl chloride and 21 lb. of vinyl acetate to produce a vinyl chloride-vinyl acetate copolymer. Analysis of the resin is shown in Table III. Reaction time was 4 hours.

EXAMPLE 14

The polymerization of Example 12 was repeated except that the monomer charge consisted of 1,370 lb. of vinyl chloride and 30 lb. of ethylene to produce a vinyl chloride-ethylene copolymer. Resin analysis is shown in Table III. Reaction time was 5 hours and 30 minutes.

The following example demonstrates the use of the copolymers of this invention in typical rigid blow molding formulations with regard to impact strength and clarity of the bottle products.

EXAMPLE 15

A series of vinyl chloride-ethylene copolymers containing various amounts of ethylene, prepared according to the instant suspension polymerization process of this invention as illustrated by the above examples, were used to formulate, in each case, a blow molding powder blend by blending about 85 weight percent of each copolymer in a Henschel intensive mixer with about 12 weight percent of a commercial impact modifier, Kane Ace B-12, (a methyl methacrylate butadiene styrene terpolymer), about 2 weight percent of dibutyl tin dithioglycolate, a thermo-stabilizer, and about 1 weight percent of a lubricant mixture of wax and polyethylene. To prepare the test samples the powder blends were blow molded in the conventional manner into 12 ounce round shouldered bottles using a 2 ½ inch by 24 to 1 l./d. extruder at the same temperature. The results are shown in Table IV below.

TABLE IV

| Vinyl Chloride Polymer (% Ethylene) | Inherent Viscosity | Impact Strength ($F_{50}$, Height in Feet) | Clarity |
|---|---|---|---|
| (a) 1.3 | 0.78 | 14 | good |
| (b) 1.4 | 0.75 | 14 | good |
| (c) 1.6 | 0.745 | 14 | good |
| (d) 1.7 | 0.74 | 14 | good |

Following the procedure of Example 15, an 8 ounce round shouldered bottle was prepared by blow molding the same type of powder blend except that a vinyl chloride-ethylene copolymer having 1.16 percent of ethylene polymerized therein and an inherent viscosity of about 0.98 was used. The thermoplastic bottle product had good clarity and an impact strength ($F_{50}$, Height) of 18 feet.

Various modifications and variations of this invention will be obvious to a worker skilled in the art and it is to be understood that such modifications and variations are to be included within the purview of this application and the spirit and scope of the appended claims.

What is claimed is:

1. A porous vinyl chloride-ethylene copolymer resin containing at least 98.3 percent by weight of vinyl chloride and 0.3 to 1.7 percent by weight of ethylene polymerized therein characterized by having a sorption value greater than about 50 parts of dioctyl phthalate plasticizer per hundred parts of resin when measured in accordance with ASTM D-1755-60T; an inherent viscosity of about 0.5 to 1.7, when measured as a 0.2 gram sample in 100 ml. of cyclohexanone at 25°C.; a dry-blend time of about 2.0 to 15.0 minutes as measured with a Brabender Plasticorder and a bulk density of about 20 to 40 lbs./cubic foot, said copolymer resin having been prepared by a polymerization process which comprises:

a. a continuous, one-stage polymerization of liquid vinyl chloride and gaseous ethylene monomers in an aqueous suspension containing per hundred parts by weight of vinyl chloride:
      1. from about 0.05 to 1.0 parts of a protective colloid,
      2. from about 0.02 to 1.0 parts of a free radical vinyl polymerization initiator,
      3. from about 150 to 400 parts of water,
      4. sufficient ethylene to afford an autogenous pressure of about 100 to 400 psig. at temperature of about 35° to 80°C. for at least 4 hours, and
   b. recovering the vinyl chloride ethylene copolymer from the suspension system.

2. A porous vinyl chloride-ethylene copolymer resin as defined in claim 1, containing at least about 98.5 percent by weight of vinyl chloride and 0.3 to about 1.5 percent of ethylene polymerized therein.

3. A porous vinyl chloride-ethylene copolymer resin as defined in claim 1 having a median particle size of about 160–190 microns.

* * * * *